US 7,827,691 B2

(12) United States Patent
Miyagawa et al.

(10) Patent No.: US 7,827,691 B2
(45) Date of Patent: Nov. 9, 2010

(54) METHOD FOR MANUFACTURING A NOZZLE PLATE

(75) Inventors: Masanori Miyagawa, Kariya (JP); Tsunehiro Uehara, Suwa (JP)

(73) Assignees: Denso Corporation, Kariya (JP); Komatsuseiki Kosakusho Co., Ltd, Suwa (JP)

(*) Notice: Subject to any disclaimer, the term of this patent is extended or adjusted under 35 U.S.C. 154(b) by 748 days.

(21) Appl. No.: 11/819,506

(22) Filed: Jun. 27, 2007

(65) Prior Publication Data

US 2008/0000085 A1 Jan. 3, 2008

(30) Foreign Application Priority Data

Jun. 28, 2006 (JP) .............................. 2006-177698

(51) Int. Cl.
*B23P 17/00* (2006.01)
(52) U.S. Cl. .................... 29/890.1; 29/831; 29/832; 29/846; 29/852; 29/854
(58) Field of Classification Search ................ 29/890.1, 29/832, 830, 831, 846, 847, 852, 854, 857; 239/585.1, 585, 2, 585.5, 585.12, 533.12, 239/533.2, 538.3, 533.14; 384/293
See application file for complete search history.

(56) References Cited

U.S. PATENT DOCUMENTS

| | | | | |
|---|---|---|---|---|
| 4,995,559 A | * | 2/1991 | Okamoto et al. ............ | 239/493 |
| 6,378,792 B2 | * | 4/2002 | Fukaya et al. .......... | 239/533.12 |
| 6,676,044 B2 | * | 1/2004 | Dallmeyer et al. ........ | 239/585.1 |
| 2004/0163254 A1 | * | 8/2004 | Miyagawa et al. ..... | 29/890.142 |
| 2004/0197038 A1 | * | 10/2004 | Fujita et al. ................. | 384/293 |
| 2004/0262430 A1 | | 12/2004 | Joseph | |
| 2006/0065648 A1 | | 3/2006 | Kameyama et al. | |

FOREIGN PATENT DOCUMENTS

| | | |
|---|---|---|
| DE | 3344709 A1 | 5/1985 |
| DE | 4443148 A1 | 6/1996 |
| DE | 10225451 A1 | 9/2003 |
| JP | 06-099581 | 4/1994 |
| JP | 11-347756 | 12/1999 |
| JP | 2000-317660 | 11/2000 |
| JP | 2004-92626 | 3/2004 |
| JP | 2004-314154 | 11/2004 |

OTHER PUBLICATIONS

German Office Action/Examination Report dated Apr. 10, 2008 in corresponding DE Application No. 10 2007 000 355.4 with English translation.
Japanese Office Action dated Aug. 23, 2010, issued in corresponding Japanese Application No. 2006-177698, with English translation.

* cited by examiner

*Primary Examiner*—Derris H Banks
*Assistant Examiner*—Tai Nguyen
(74) *Attorney, Agent, or Firm*—Nixon & Vanderhye PC

(57) ABSTRACT

A method for manufacturing a nozzle plate, which has a nozzle hole, includes radiating of a plurality of laser beams. The method further includes applying of the plurality of laser beams to at least one axial end surface of a plate member substantially throughout an inner circumferential periphery, which defines a boundary between a small hole defining the nozzle hole and the plate member.

13 Claims, 6 Drawing Sheets

METHOD FOR MANUFACTURING A NOZZLE PLATE

CROSS REFERENCE TO RELATED APPLICATIONS

This application is based on and incorporates herein by reference Japanese Patent Application No. 2006-177698 filed on Jun. 28, 2006.

FIELD OF THE INVENTION

The present invention relates to a method for manufacturing a nozzle plate. The present invention further relates to a method for shaping a nozzle hole for the nozzle plate.

BACKGROUND OF THE INVENTION

Conventionally, an injector is applied to a fluid device such as a fuel injection valve and an inkjet printer. In such an injector, small nozzle holes are defined for spraying fluid therethrough. For example, a plate member is blanked to form such small nozzle holes. In this forming method, the plate member is blanked, and small burrs are apt to be left around the blanked portion in the plate member.

Conventionally, such small burrs are removed by grinding an end surface of the blanked plate member. The small burrs may be constantly trimmed by grinding the end surface of the plate member. However, in this case, a grinding device such as a brush needs to be mechanically urged onto the plate member formed with the nozzle holes. In this grinding process, the end section of each nozzle hole is apt to be tucked into the nozzle hole. Consequently, it is difficult to accurately form the end section of the nozzle hole. In addition, when the plate member is applied with chemical polishing such as etching, the shape of the small hole may vary in dependence upon the shape of a burr before being applied with the chemical polishing. Accordingly, it is difficult to accurately form the end section of the nozzle hole, even when the chemical polishing is applied to the plate member. Furthermore, in this chemical polishing, it is difficult to constantly form the end section of the nozzle hole uniformly among multiple plate members. In addition, waste materials such as etching solution may be exhausted after chemical polishing to cause pollution. Additionally, the plate member may be corroded due to being submerged in etching solution.

According to JP-A-6-99581, a small burr is removed from the plate member by grinding or applying a laser beam, after blanking the plate member. However, in JP-A-6-99581, the radiation range of the laser beam is set greater than the nozzle hole such that the laser beam is applied to entirely surround the nozzle hole. Accordingly, large output power is required to apply the laser beam. In addition, the structure of the base material constructing the plate member may be deteriorated due to application of the laser beam with large output power.

SUMMARY OF THE INVENTION

The present invention addresses the above disadvantage.

According to one aspect of the present invention, a method for manufacturing a nozzle plate, which has a nozzle hole for fluid, includes radiating of a plurality of laser beams. The method further includes applying of the plurality of laser beams to at least one axial end surface of a plate member to pass across an inner circumferential periphery, which defines a boundary between a small hole defining the nozzle hole and the plate member, substantially throughout the inner circumferential periphery.

According to another aspect of the present invention, a method for shaping a nozzle hole in a nozzle plate includes radiating a plurality of laser beams. The method further includes applying the plurality of laser beams to the nozzle hole to pass across an inner circumferential periphery, which defines a boundary between the nozzle hole and the nozzle plate, substantially throughout the inner circumferential periphery.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
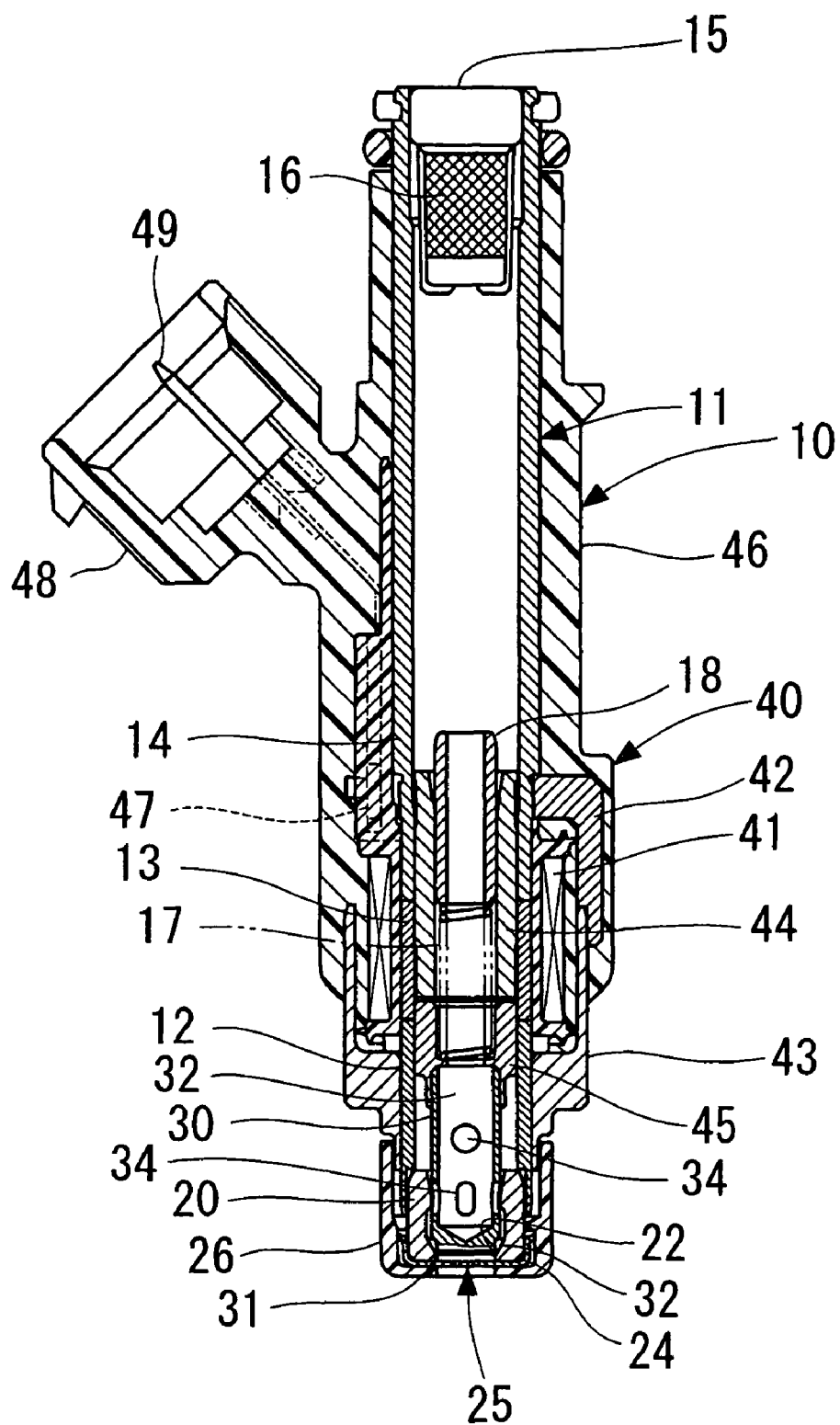
FIG. 1 is a sectional view showing an injector including a nozzle plate according to a first embodiment.

As shown in FIG. 1, an injector 10 is provided to an internal combustion engine such as a gasoline engine for injecting fuel into intake air drawn into a combustion chamber of the engine. The fuel serves as fluid. The injector 10 may be provided to a direct-injection gasoline engine, in which fuel is directly injected into a combustion chamber. Alternatively, the injector 10 may be provided to another engine such as a diesel engine. The injector 10 may spray fluid other than fuel. For example, the injector 10 may spray ink.

The injector 10 includes an accommodating pipe 11. The accommodating pipe 11 is in a substantially cylindrical shape having a thing wall. The accommodating pipe 11 includes a first magnetic portion 12, a non-magnetic portion 13, and a second magnetic portion 14. The non-magnetic portion 13 restricts the first magnetic portion 12 and the second magnetic portion 14 from causing magnetic short circuit therebetween. The accommodating pipe 11 has one end defining a fuel inlet 15. The fuel inlet 15 of the injector 10 is provided with a fuel filter 16. The fuel filter 16 removes foreign matters contained in fuel supplied into the injector 10 after passing through an unillustrated fuel rail.

Figure 2A:
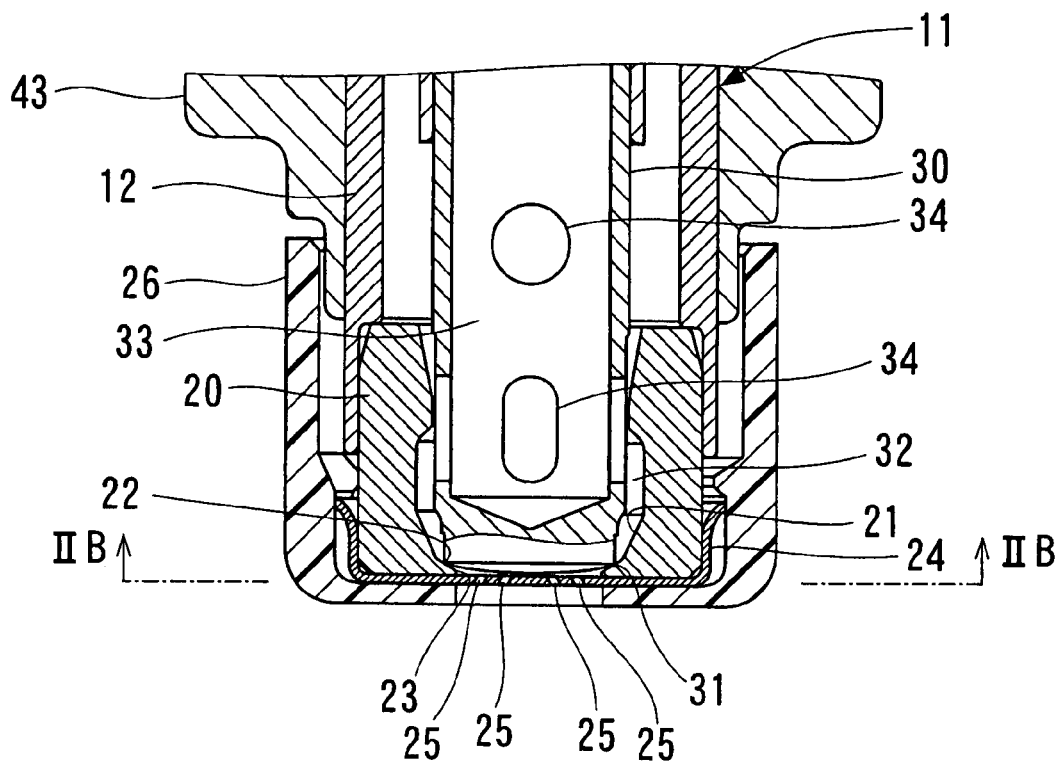
FIG. 2A is a sectional view showing a tip end of the injector and the nozzle plate according to the first embodiment.

The accommodating pipe 11 has the other end on the opposite side of the fuel inlet 15. The other end of the accommodating pipe 11 corresponds to an end of the first magnetic portion 12. The other end of the first magnetic portion 12 has an inner circumferential periphery provided with a valve body 20. The valve body 20 is in a substantially cylindrical shape. The valve body 20 is fixed to the inner circumferential periphery of the first magnetic portion 12. As shown in FIG. 2A, the valve body 20 has a substantially conical inner circumferential periphery 21 having the inner diameter reduced toward the tip end. The inner circumferential periphery 21 of the valve body 2 defines a valve seat 22. The valve body 20 has an opening 23 on the opposite side of the accommodating pipe 11 with respect to the inner circumferential periphery 21. A nozzle plate 24 is provided to an end of the valve body 20 on the opposite side of the accommodating pipe 11. The nozzle plate 24 surrounds the outside of the opening 23 of the valve body 20. The nozzle plate 24 has nozzle holes 25 each communicating the end surface of the nozzle plate 24 on the side of the valve body 20 with the end surface of the nozzle plate 24 on the opposite side of the valve body 20. The surface of the nozzle plate 24 on the opposite side of the valve body 20 is surrounded with a sleeve 26. That is, the outside of the nozzle plate 24 is surrounded with the sleeve 26.

A needle 30 is axially movable through the inner circumferential periphery of the first magnetic portion 12 of the accommodating pipe 11 and the valve body 20. The needle 30 serves as a valve member. The needle 30 is substantially coaxial with respect to both the accommodating pipe 11 and the valve body 20. The needle 30 has an end in the vicinity of the nozzle plate 24. The end of the needle 30 defines a seal portion 31. The seal portion 31 is adapted to being seated onto the valve seat 22 defined in the valve body 20. The needle 30 and the valve body 20 define a fuel passage 32 therebetween. Fuel passes through the fuel passage 32. The seal portion 31 of the needle 30 is lifted from the valve seat 22, so that the fuel passage 32 communicates with the nozzle holes 25 trough the opening 23. In this embodiment, the needle 30 is in a substantially cylindrical shape. The needle 30 defines a fuel passage 33 therein. The needle 30 has a hole 34 through which the fuel passage 32 communicates with the fuel passage 33. The needle 30 is not limited to be in a substantially cylindrical shape. The needle 30 may be in a substantially solid column shape.

Referring to FIG. 1, the injector 10 includes a driving portion 40 for actuating the needle 30. The driving portion 40 is constructed of a solenoid actuator. The driving portion 40 includes a coil portion 41, a plate housing 42, a holder 43, a stationary core 44, and a movable core 45. The plate housing 42 and the holder 43 are formed of a magnetic material, and are magnetically connected with each other. The plate housing 42 surrounds the outer circumferential periphery of the coil portion 41. The holder 43 is surrounds the outer circumferential periphery of the accommodating pipe 11, such that the holder 43 supports the coil portion 41 from the side of the nozzle holes 25. The outer circumferential peripheries of the coil portion 41, the plate housing 42, the holder 43, and the accommodating pipe 11 are surrounded by a resin mold 46. The coil portion 41 electrically connects with a terminal 49 via a wiring member 47. The terminal 49 is provided to a connector 48.

The stationary core 44 is fixed to the radially inner side of the coil portion 41 via the accommodating pipe 11. The stationary core 44 is formed of a magnetic material such as a ferrous material to be in a substantially cylindrical shape. The stationary core 44 and the movable core 45 define a predetermined gap therebetween. The gap between the stationary core 44 and the movable core 45 defines a lift of the needle 30.

The movable core 45 is received on the radially inner side of the accommodating pipe 11. The movable core 45 is axially movable on the radially inner side of the accommodating pipe 11. The end of the movable core 45, which is on the opposite side of the nozzle plate 24, is opposed to the stationary core 44. The movable core 45 is formed of a magnetic material such as a ferrous material to be in a substantially cylindrical shape. The end of the needle 30 on the opposite side of the seal portion 31 is fixed to the inner circumferential periphery of the movable core 45. In this structure, the needle 30 is axially movable integrally with the movable core 45.

The movable core 45 is in contact with a spring 17 serving as a biasing member. The spring 17 has one axial end being in contact with the movable core 45. The spring 17 has the other axial end being in contact with an adjusting pipe 18. The adjusting pipe 18 is fixed to the inner circumferential periphery of the stationary core 44 by press-insertion or the like. The spring 17 is axially extendable. In this structure, the spring 17 is fixed at one end thereof to the adjusting pipe 18, and the spring 17 biases the integrated movable core 45 and the needle 30 onto the valve seat 22 at the other end thereof. Biasing force of the spring 17 corresponds to the length by which the adjusting pipe 18 is press-inserted into the stationary core 44. When the coil portion 41 is not supplied with electricity, the integrated movable core 45 and the needle 30 are biased toward the valve seat 22. Thus, the seal portion 31 is seated onto the valve seat 22.

Next, the operation of the injector 10 is described.

When supplying electricity to the coil portion 41 is terminated, the stationary core 44 and the movable core 45 do not generate magnetic attractive force therebetween. In this condition, the movable core 45 is biased toward the valve body 20 by being applied with the biasing force of the spring 17. In this condition, the needle 30 integrated with the movable core 45 is biased toward the valve body 20, so that the seal portion 31 is seated onto the valve seat 22. Thus, the fuel passage 32 and the nozzle holes 25 are blocked from each other, so that fuel is not sprayed through the nozzle holes 25.

When the coil portion 41 is supplied with electricity, the coil portion 41 generates magnetic field, so that the plate housing 42, the second magnetic portion 14, the stationary core 44, the movable core 45, the first magnetic portion 12, and the holder 43 form a magnetic circuit thereamong. Thus, the stationary core 44 and the movable core 45 generate magnetic attractive force therebetween. When the magnetic attractive force becomes greater than the biasing force of the spring 17, the movable core 45 integrated with the needle 30 is attracted toward the stationary core 44. Thus, the seal portion 31 of the needle 30 is lifted from the valve seat 22 of the valve body 20. When the seal portion 31 is lifted from the valve seat 22, fuel flows from the fuel passage 32 into the nozzle holes 25 of the nozzle plate 24 through the gap between the seal portion 31 and the valve seat 22. Thus, fuel is sprayed through the nozzle holes 25.

When supplying electricity to the coil portion 41 is terminated, the magnetic attractive force between the stationary core 44 and the movable core 45 disappears. In this condition, the movable core 45 and the needle 30 move toward the valve body 20 by being applied with the biasing force of the spring 17. The seal portion 31 of the needle 30 is seated onto the valve seat 22 of the valve body 20, so that spraying of fuel through the nozzle holes 25 is terminated.

As follows, a method for manufacturing the nozzle plate 24 is described with reference to FIGS. 3A, 3B.

Figure 2B:
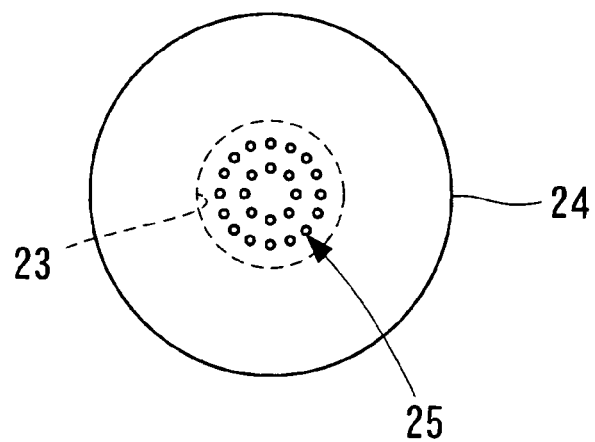
FIG. 2B is a sectional view taken along the line IIB-IIB in FIG. 2A and depicting only the nozzle plate.
Figure 3A:
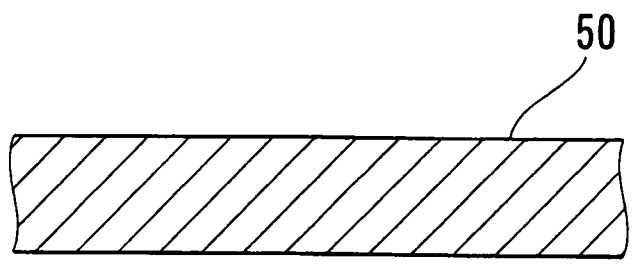
FIGS. 3A to 3D are sectional views each showing a process for manufacturing the nozzle plate according to the first embodiment.

As shown in FIG. 3A, the nozzle plate 24 is formed of a plate member 50 made of a metallic material such as stainless steel. As referred to FIG. 2B, the nozzle plate 24 has multiple nozzle holes 25. As follows, manufacturing of one of the multiple nozzle hole 25 is described with reference to FIGS. 3A to 3D.

Figure 3B:
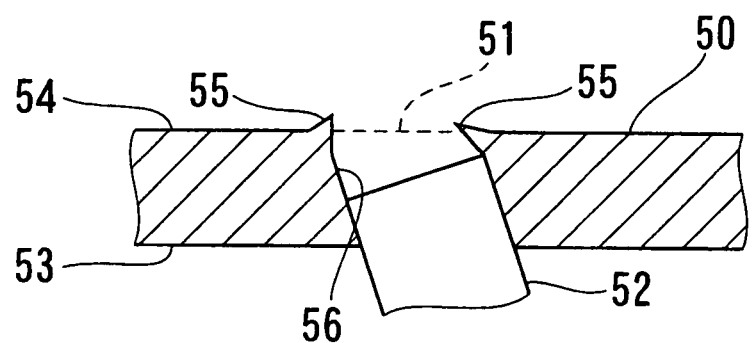

Referring to FIG. 3B, the plate member 50 is provided with a small hole 51 by press-forming. The small hole 51 is formed by blanking the plate member 50 with respect to a substantially thickness direction, using a punch 52. The punch 52 is applied from one axial end surface 53 of the plate member 50 toward the other axial end surface 54. Thus, the small hole 51 is formed in the plate member 50. The small hole 51 is a through hole extending from the axial end surface 53 to the axial end surface 54. The small hole 51 defines corresponding one of the nozzle holes 25. The punch 52 is hammered from the axial end surface 53 toward the axial end surface 54. The axial end surface 53 is an upstream surface with respect to a hammering direction, i.e., a punching direction of the punch 52. The axial end surface 54 is a downstream surface with respect to the hammering direction. Multiple small holes 51 are formed using multiple punches 52 to define multiple nozzle holes 25 in the nozzle plate 24. After forming the small hole 51, the punch 52 is drawn toward the axial end surface 53 opposite to the hammering direction.

The hammering of the punch 52 into the plate member 50 leaves a burr 55 around the small hole 51 on the downstream axial end surface 54. The burr 55 is irregularly formed. For example, the burr 55 protrudes outwardly from the axial end surface 54, and/or the burr 55 radially inwardly protrudes into the small hole 51. In this condition, the burr 55 protrudes from an inner circumferential periphery 56, which defines the small hole 51 in the plate member 50, into the small hole 51.

Figure 3C:
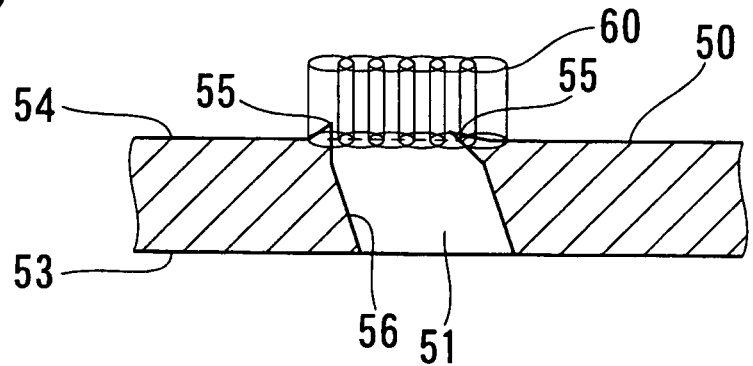
Figure 3D:
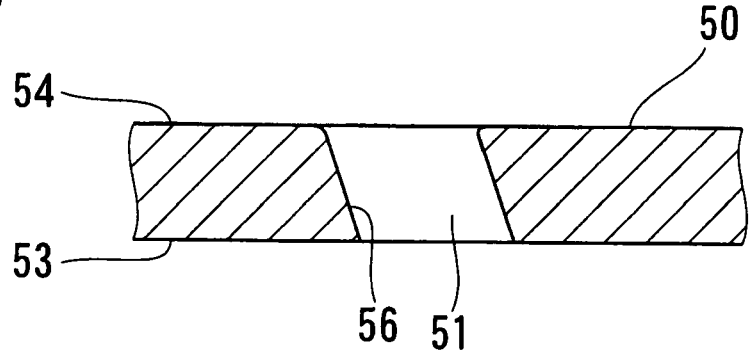
Figure 4:
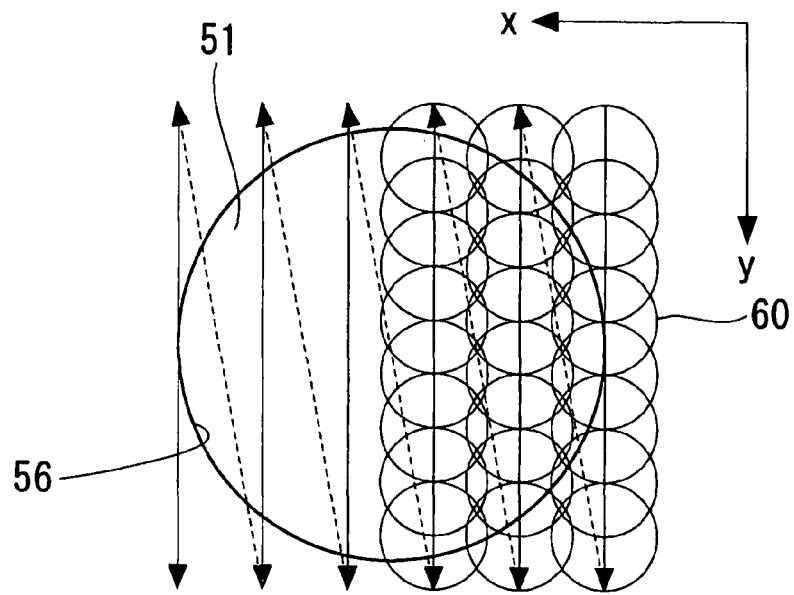
FIG. 4 is a schematic view showing a path of a laser beam applied to a small hole in the manufacturing of the nozzle plate according to the first embodiment.

As shown in FIG. 3C, a laser beam 60 is applied to the axial end surface 54, after drawing the punch 52 out of the plate member 50. As shown in FIG. 4, the laser beam 60 is applied to pass across the inner circumferential periphery 56 defining the boundary between the small hole 51 and the plate member 50. Specifically, the laser beam 60 is applied both the plate member 50 and the small hole 51 to pass across the inner circumferential periphery 56 of the plate member 50. Referring to FIG. 3C, the laser beam 60 is applied to the burr 55 formed around the axial end surface 54. Referring to FIG. 4, the laser beam 60 is applied to the plate member 50 by moving along the x direction, which is the radial direction of the small hole 51, and the y direction, which is perpendicular to the x direction. Specifically, in the beginning, the laser beam 60 is applied to the plate member 50 while moving along the y direction in FIG. 4. When the laser beam 60 reaches the end of the small hole 51 after moving along the y direction, the laser beam 60 returns toward an initial position with respect to the y direction, and the laser beam 60 moves along the x direction. Thus, the laser beam 60 is applied while moving in the x and y directions for multiple times, thereby being applied throughout the inner circumferential periphery 56 defining the small hole 51 in the plate member 50.

The laser beam 60 is applied throughout the inner circumferential periphery 56 defining the small hole 51 in the plate member 50, so that the burr 55 formed around the axial end surface 54 is welded and vaporized. Thus, referring to FIG. 3D, the burr 55 formed around the axial end surface 54 is removed. The laser beam 60 is applied in a radiation range. The laser beam 60 moves by a moving distance with respect to each of the x and y directions. The moving distance of the laser beam 60 with respect to each of the x and y directions is less than the inner diameter of the radiation range of the laser beam 60.

Specifically, referring to FIG. 4, each circle 60 defines the radiation range of each radiation of the laser beam 60. The adjacent circles 60 overlap one another. In this operation, each radiation of the laser beam 60 and adjacent radiation of the laser beam 60 overlap one another by defining the moving distance to be less than the inner diameter of the radiation range.

The multiple radiation ranges of the laser beams 60 overlap one another. The radiation ranges of the laser beams 60 are defined to overlap one another, so that the burr 55 is applied with the laser beams 60 for multiple times. Consequently, even when the output power of the laser beam 60 is low, the burr 55 can be steadily removed from the axial end surface 54.

In addition, even when each of the radiation ranges of the laser beams 60 is small, the burr 55 can be steadily removed from the axial end surface 54.

In this embodiment, the laser beam 60 is applied to the axial end surface 54. That is, the laser beam 60 is applied to the downstream axial end surface 54 with respect to the hammering direction of the punch 52. As described above, the hammering of the punch 52 into the plate member 50 is apt to leave the small burr 55 around the small hole 51 on the downstream axial end surface 54 with respect to the hammering direction of the punch 52. In the above operation, the laser beam 60 is applied to the axial end surface 54, so that the small burr 55 can be steadily removed from the axial end surface 54.

Thus, the small hole 51 is formed in the plate member 50 by completing removal of the burr 55 by applying the laser beam 60. The burr 55 is removed from the axial end surface 54 by applying the laser beam 60, so that the shape of the end section of the axial end surface 54 defining the small hole 51 becomes constant.

In the above manufacturing process, the small holes 51 are formed in the plate member 50, and subsequently, the plate member 50 is formed to be in a predetermined shape by blanking, press-forming, or the like. Thus, the plate member 50 is formed to be in a cup-shaped or plate-shaped nozzle plate 24, for example. The small holes 51 respectively serve as the nozzle holes 25.

As described, in this embodiment, the laser beam 60 is applied across the inner circumferential periphery 56 defining the boundary between the small hole 51 and the plate member 50 in the manufacturing process of the nozzle plate 24. Thus, the burr 55 formed around the axial end surface 54 is removed by applying of the laser beam 60. The small burr 55, which is formed by punching the plate member 50 when the small hole 51 is formed, can be steadily removed, so that accuracy in the shape of the nozzle plate 24 can be enhanced. In addition, each nozzle hole 25 can be constantly formed in the nozzle plate 24. Furthermore, the nozzle holes 25 can be constantly formed among multiple nozzle plates 24.

In this first embodiment, the laser beams 60 are applied throughout the inner circumferential peripheries 56 each defining the small hole 51 in the plate member 50, such that the laser beams 60 overlap one another. Each small burr 55 is applied with the laser beams 60 by multiple times. Consequently, even when the output power of each application of the laser beams 60 is low, the burr 55 can be steadily removed. The output power of each of the laser beams 60 is low, so that the plate member 50 can be restricted from being excessively heated and deteriorated due to application of the laser beams 60. Thus, influence of application of the laser beam 60 can be reduced, so that the base material constructing the plate member 50 can be protected.

Second Embodiment

Figure 5A:
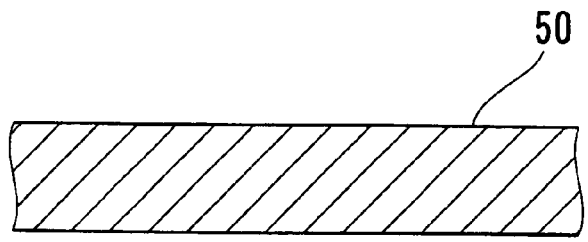
FIGS. 5A to 5E are sectional views each showing a process for manufacturing the nozzle plate according to a second embodiment.
Figure 5B:
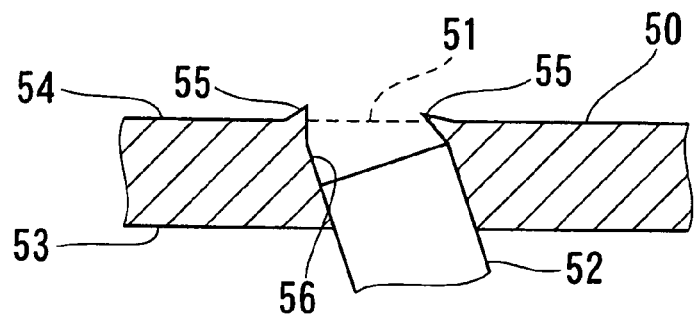
Figure 5C:
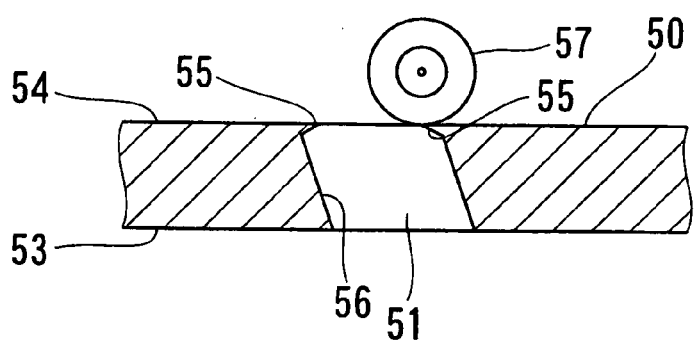

In this second embodiment, as shown in FIGS. 5A, 5B, the plate member 50 is applied with the punch 52, and thereby provided with the small hole 51. That is, forming of the small hole 51 in the plate member 50 is similar to that in the first embodiment. In this second embodiment, the small hole 51 is formed in the plate member 50, and subsequently, as shown in FIG. 5C, the downstream axial end surface 54 of the plate member 50 with respect to the hammering direction of the punch 52 is grinded using a grinding device 57 such as a brush and a grindstone. The plate member 50 is grinded using the grinding device 57, so that a burr 55, which protrudes from the axial end surface 54 to the opposite side of the axial end surface 53, is trimmed. Furthermore, a relatively large burr 55 can be also removed by grinding using the grinding device 57. However, it is difficult to remove a burr 55 protruding radially inside the small hole 51 and a relatively small burr 55, even grinding using the grinding device 57. In addition, a small burr 55, which protrudes from the axial end surface 54 to the opposite side of the axial end surface 53, may be tucked into the small hole 51 due to grinding the axial end surface 54 using the grinding device 57.

Figure 5D:
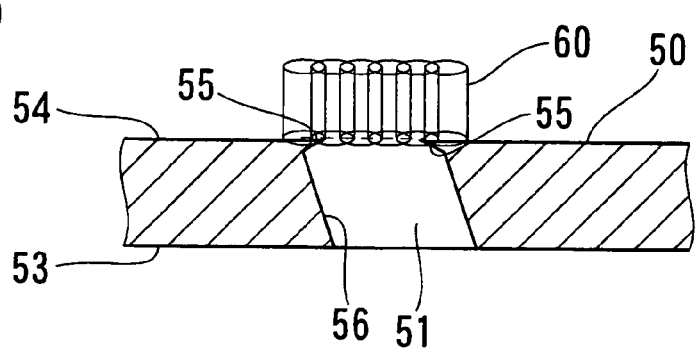

Therefore, as shown in FIG. 5D, a laser beam 60 is applied to the axial end surface 54, after grinding of the axial end surface 54 using the grinding device 57. The laser beam 60 is applied throughout the inner circumferential periphery 56 by moving across the inner circumferential periphery 56 similarly to the first embodiment. Thus, both the small burr 55 on the axial end surface 54 and the small burr 55 protruding into the small hole 51 can be removed.

In this second embodiment, the laser beam 60 is applied to the axial end surface 54. That is, the laser beam 60 is applied to the downstream axial end surface 54 with respect to the hammering direction of the punch 52, after grinding the downstream axial end surface 54 using the grinding device 57. As described above, the hammering of the punch 52 into the plate member 50 is apt to leave the small burr 55 around the small hole 51 on the downstream axial end surface 54 with respect to the hammering direction of the punch 52. In addition, it is difficult to remove the burr 55 protruding into the small hole 51, even grinding the axial end surface 54 using the grinding device 57. Therefore, in the above operation, the laser beam 60 is applied to the axial end surface 54, so that the small burr 55 can be steadily removed from the axial end surface 54.

Figure 5E:
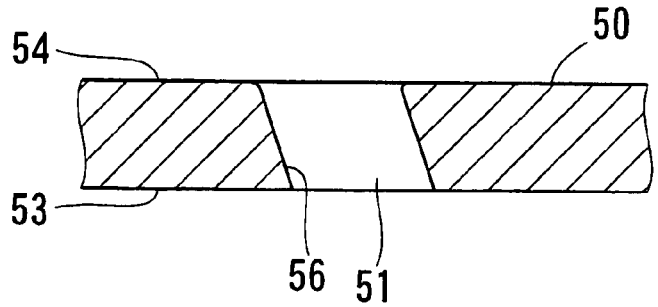

Referring to FIG. 5E, the small hole 51 is formed in the plate member 50 by completing removal of the burr 55 by applying the laser beam 60. The burr 55 is removed from the axial end surface 54 by applying the laser beam 60, so that the end section of the axial end surface 54 defining the small hole 51 can be uniformly formed.

In this second embodiment, the small burr 55 is removed by applying laser beam 60, after trimming the relatively large burr 55 using the grinding device 57. Thus, output power of the laser beam 60 can be further reduced, so that the base material constructing the plate member 50 can be protected from influence caused by applying the laser beam 60. The trimming of the burr 55 using the grinding device 57 is a preliminary treatment in advance of removing of the burr 55 by applying the laser beam 60. Therefore, force applied to the plate member 50 for grinding the plate member 50 may be reduced, so that the shape of the plate member 50 can be maintained. Thus, accuracy in the shape of the nozzle plate 24 can be enhanced.

Other Embodiment

Figure 6:
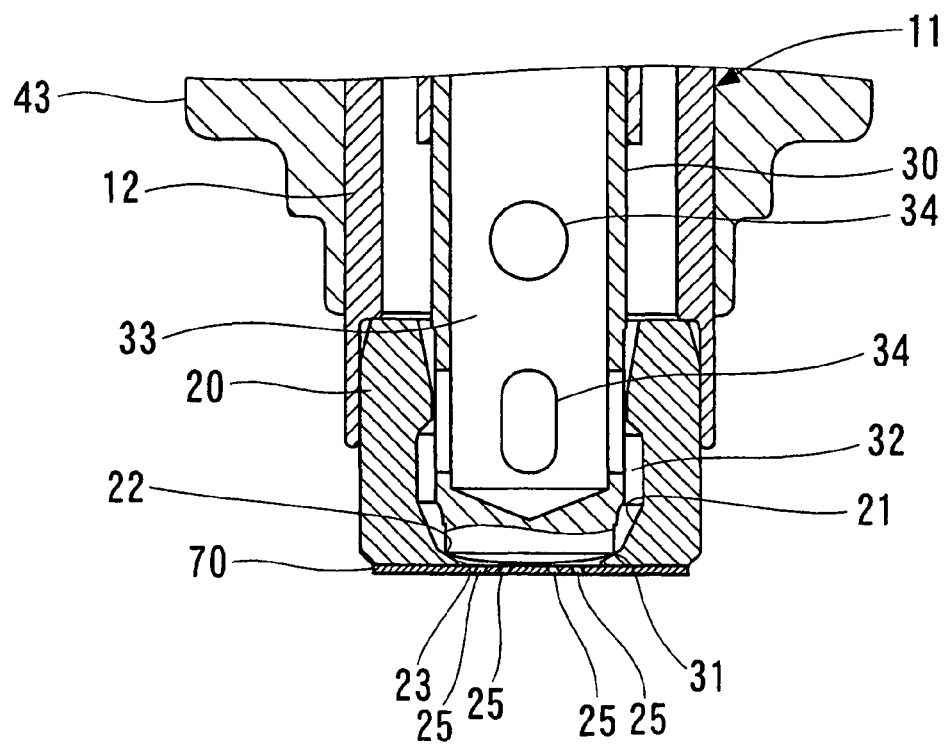
FIG. 6 is a sectional view showing an injector including a nozzle plate according to an other embodiment.

The shape of the nozzle plate 24 is not limited to the cup-shape shown in FIG. 2A. As shown in FIG. 6, a nozzle plate 70 may be in a plate-shape, and may be provided to the valve body 20 of the injector 10.

Figure 7A:
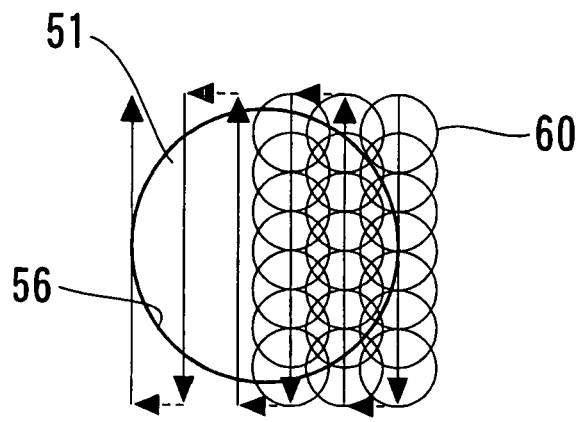
FIGS. 7A to 7C are schematic views each showing a path of the laser beam applied to the small hole in the manufacturing of the nozzle plate according to an other embodiment.
Figure 7B:
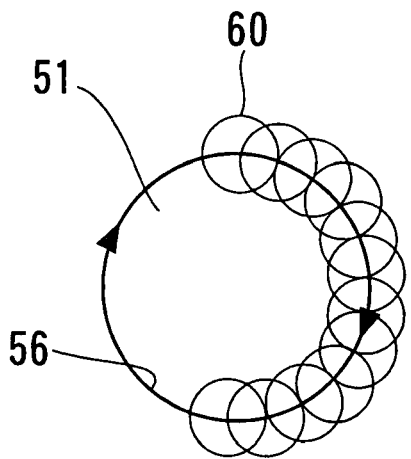
Figure 7C:
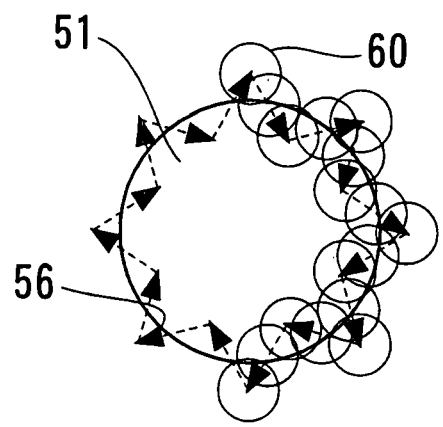

In the above embodiments, referring to FIG. 4, application of the laser beam 60 is repeated along the y direction to define one row, thereafter, the position of the application is shifted with respect to the x direction, subsequently, the application is resumed along the y direction. Alternatively, as described below, the path of the application of the laser beams 60 may be defined as appropriate, such that the laser beam 60 is substantially entirely applied to the inner circumferential periphery 56 of the plate member 50 across the inner circumferential periphery 56 defining the small hole 51 in the plate member 50. As shown in FIG. 7A, for example, the laser beam 60 may be substantially entirely applied to the inner circumferential periphery 56 of the plate member 50 by repeating moving of the application of the laser beam 60 back and forth along the y direction while shifting the application with respect to the x direction. Alternatively, as shown in FIG. 7B, the laser beam 60 may be applied circumferentially along the inner circumferential periphery 56 of the plate member 50 while moving across the inner circumferential periphery 56. Alternatively, as shown in FIG. 7C, the laser beam 60 may be applied along the inner circumferential periphery 56 of the plate member 50 while repeating zigzag-movement radially across the inner circumferential periphery 56.

In other words, in the above operations, the laser beams 60 are respectively applied in the radiation ranges. The laser beams 60 may be applied along a first direction, which is the radial direction of the small hole 51, for a length equal to or greater than an inner diameter of the small hole 51 to pass through at least partially the inner circumferential periphery 56, such that the radiation ranges overlaps one another.

The applying of the plurality of laser beams 60 may be shifted in a second direction, which is substantially perpendicular to the first direction, after applying of the plurality of laser beams 60 along the first direction for the length. The plurality of laser beams 60 is applied along the first direction for the length, such that the plurality of radiation ranges overlaps one another, after shifting of the applying of the plurality of laser beams 60.

Alternatively, the laser beams 60 are respectively applied in the radiation ranges to pass along the inner circumferential periphery 56 such that the radiation ranges overlaps one another.

Alternatively, the laser beams 60 are respectively applied in the radiation ranges to repeat zigzag-movement radially across the inner circumferential periphery 56 such that the radiation ranges overlaps one another.

The laser beams 60 may be intermittently radiated, and intermittently applied to the at least one axial end surface 53, 54 of a plate member 50.

Each of the radiation ranges has a circumscribed circle having the diameter, which may be less than the inner diameter of the small hole 51.

The laser beam 60 is not limited to being applied to the downstream axial end surface 54 provided with the small hole 51 by hammering the punch 52 into the plate member 50. The laser beam 60 may be applied to the upstream axial end surface 53 of the plate member 50 on the upstream side with respect to the hammering direction.

The manufacturing method of the nozzle plate is not limited to being applied to the injector 10. For example, the manufacturing method of the nozzle plate may be applied to any other nozzle structure, such as an inkjet nozzle of an inkjet printer, having small holes for spraying fluid therethrough.

The number of the nozzle hole 25 may be one.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A method for manufacturing a nozzle plate, which has a nozzle hole for fluid, the method comprising:
   radiating a plurality of laser beams; and
   applying the plurality of laser beams to at least one axial end surface of a plate member to pass across an inner circumferential periphery, which defines a boundary between a small hole defining the nozzle hole and the plate member, substantially throughout the inner circumferential periphery,
   wherein the plurality of laser beams is respectively applied in a plurality of radiation ranges, and
   the plurality of radiation ranges overlap one another.

2. The method according to claim 1, further comprising:
   punching the plate member with respect to a thickness direction of the plate member to form the small hole, before applying of the plurality of laser beams,
   wherein the laser beam is applied to an axial end surface of the plate member downstream with respect to a punching direction of the plate member.

3. The method according to claim 1, wherein the plurality of laser beams is intermittently radiated and intermittently applied to the at least one axial end surface of a plate member.

4. A method for manufacturing a nozzle plate, which has a nozzle hole for fluid, the method comprising:
   radiating a plurality of laser beams;
   applying the plurality of laser beams to at least one axial end surface of a plate member to pass across an inner circumferential periphery, which defines a boundary between a small hole defining the nozzle hole and the plate member, substantially throughout the inner circumferential periphery;
   punching the plate member with respect to a thickness direction of the plate member to form the small hole, before applying of the plurality of laser beams; and
   grinding an axial end surface of the plate member downstream with respect to a punching direction of the plate member,
   wherein the laser beam is applied to the axial end surface, which is grinded.

5. The method according to claim 4,
   wherein the plurality of laser beams is respectively applied in a plurality of radiation ranges, and
   each of the plurality of radiation ranges has a circumscribed circle having diameter, which is less than an inner diameter of the small hole.

6. The method according to claim 4, further comprising:
   punching the plate member with respect to a thickness direction of the plate member to form the small hole, before applying of the plurality of laser beams,
   wherein the laser beam is applied to an axial end surface of the plate member downstream with respect to a punching direction of the plate member.

7. A method for manufacturing a nozzle plate, which has a nozzle hole for fluid, the method comprising:
   radiating a plurality of laser beams; and
   applying the plurality of laser beams to at least one axial end surface of a plate member to pass across an inner circumferential periphery, which defines a boundary between a small hole defining the nozzle hole and the plate member, substantially throughout the inner circumferential periphery,
   wherein the plurality of laser beams is respectively applied in a plurality of radiation ranges, and
   the plurality of laser beams is applied along a first direction, which is a radial direction of the small hole, for a length equal to or greater than an inner diameter of the small hole to pass through at least partially the inner circumferential periphery such that the plurality of radiation ranges overlaps one another.

8. The method according to claim 7,
   wherein the applying of the plurality of laser beams is shifted in a second direction, which is substantially perpendicular to the first direction, after applying of the plurality of laser beams along the first direction for the length, and
   the plurality of laser beams is applied along the first direction for the length, such that the plurality of radiation ranges overlaps one another, after shifting of the applying of the plurality of laser beams.

9. The method according to claim 7, further comprising:
   punching the plate member with respect to a thickness direction of the plate member to form the small hole, before applying of the plurality of laser beams,
   wherein the laser beam is applied to an axial end surface of the plate member downstream with respect to a punching direction of the plate member.

10. A method for manufacturing a nozzle plate, which has a nozzle hole for fluid, the method comprising:
    radiating a plurality of laser beams; and
    applying the plurality of laser beams to at least one axial end surface of a plate member to pass across an inner circumferential periphery, which defines a boundary between a small hole defining the nozzle hole and the plate member, substantially throughout the inner circumferential periphery,
    wherein the plurality of laser beams is respectively applied in a plurality of radiation ranges, and
    the plurality of laser beams is applied to pass along the inner circumferential periphery such that the plurality of radiation ranges overlaps one another.

11. The method according to claim 10, further comprising:
    punching the plate member with respect to a thickness direction of the plate member to form the small hole, before applying of the plurality of laser beams,
    wherein the laser beam is applied to an axial end surface of the plate member downstream with respect to a punching direction of the plate member.

12. A method for manufacturing a nozzle plate, which has a nozzle hole for fluid, the method comprising:
    radiating a plurality of laser beams; and
    applying the plurality of laser beams to at least one axial end surface of a plate member to pass across an inner circumferential periphery, which defines a boundary between a small hole defining the nozzle hole and the plate member, substantially throughout the inner circumferential periphery, wherein the plurality of laser beams is respectively applied in a plurality of radiation ranges, and the plurality of laser beams is applied to repeat zigzag-movement radially across the inner circumferential periphery such that the plurality of radiation ranges overlaps one another.

13. The method according to claim 12, further comprising:

punching the plate member with respect to a thickness direction of the plate member to form the small hole, before applying of the plurality of laser beams, wherein the laser beam is applied to an axial end surface of the plate member downstream with respect to a punching direction of the plate member.

* * * * *